United States Patent
Falkmann et al.

(10) Patent No.: US 8,954,228 B2
(45) Date of Patent: Feb. 10, 2015

(54) GAS TURBINE ENGINE FAILURE DETECTION

(75) Inventors: Ronald Alan Falkmann, Greenwood, IN (US); Michael T. Elliott, Carmel, IN (US); Edward A. Lheureau, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 804 days.

(21) Appl. No.: 12/618,060

(22) Filed: Nov. 13, 2009

(65) Prior Publication Data

US 2010/0168952 A1 Jul. 1, 2010

Related U.S. Application Data

(60) Provisional application No. 61/203,925, filed on Dec. 30, 2008.

(51) Int. Cl.
| | |
|---|---|
| G06F 7/00 | (2006.01) |
| G06F 19/00 | (2011.01) |
| F02K 9/66 | (2006.01) |
| F02C 9/00 | (2006.01) |

(52) U.S. Cl.
CPC .............. *F02C 9/00* (2013.01); *F05D 2270/708* (2013.01); *F05D 2270/304* (2013.01)
USPC ............................ 701/33.6; 701/33.9; 60/201

(58) Field of Classification Search
CPC ............................. F02C 9/00; F05D 2270/304
USPC ........ 701/31.7, 33.7, 33.8, 33.9, 33.6; 60/201
See application file for complete search history.

(56) References Cited

U.S. PATENT DOCUMENTS

| | | | | |
|---|---|---|---|---|
| 3,982,389 | A * | 9/1976 | Maker | 60/791 |
| 4,136,517 | A | 1/1979 | Brown | |
| 4,184,327 | A * | 1/1980 | Cornett et al. | 60/240 |
| 4,397,148 | A | 8/1983 | Stockton et al. | |
| 4,509,110 | A * | 4/1985 | Levesque et al. | 700/33 |
| 4,528,812 | A | 7/1985 | Cantwell | |
| 4,641,517 | A * | 2/1987 | Spock et al. | 73/112.01 |
| 4,712,372 | A | 12/1987 | Dickey et al. | |
| 4,716,531 | A | 12/1987 | Saunders et al. | |
| 4,722,061 | A | 1/1988 | Carlisle et al. | |
| 5,072,580 | A * | 12/1991 | Patterson et al. | 60/242 |
| 5,115,635 | A | 5/1992 | Jennings et al. | |
| 5,233,512 | A | 8/1993 | Gutz et al. | |
| 5,267,435 | A * | 12/1993 | Frenkel et al. | 60/204 |

(Continued)

FOREIGN PATENT DOCUMENTS

EP 0 694 120 B1 5/2001

*Primary Examiner* — Calvin Cheung
*Assistant Examiner* — Aaron L Troost
(74) *Attorney, Agent, or Firm* — Krieg DeVault LLP

(57) ABSTRACT

A gas turbine engine control system is disclosed having a fault detection system capable of detecting a high N1 condition. N1 rotational speed is measured and, in two different locations, subtracted from a target N1 value and a requested N1 value. The resultant error values are scaled by a gain that is scheduled as a function of N2 rotational rate. Each error value is accumulated with separate integrators that have independent maximum and minimum limits. The integrators are reset based upon a number of conditions. A number of additional conditions must also be satisfied for the fault detection system to trigger a fault condition. If the additional conditions are satisfied and the integrators are accumulating values, then a fault condition is set if either or both integrators accumulate a value that reaches a selected limit.

19 Claims, 6 Drawing Sheets

(56) References Cited

U.S. PATENT DOCUMENTS

| | | | |
|---|---|---|---|
| 5,303,545 A * | 4/1994 | Larkin | 60/239 |
| 5,452,200 A * | 9/1995 | Barry | 700/41 |
| 5,622,045 A * | 4/1997 | Weimer et al. | 60/204 |
| 5,775,089 A | 7/1998 | Skarvan | |
| 5,775,090 A | 7/1998 | Skarvan | |
| 6,321,525 B1 | 11/2001 | Rogers | |
| 6,357,219 B1 | 3/2002 | Dudd, Jr. et al. | |
| 6,487,490 B1 | 11/2002 | Kamath et al. | |
| 6,633,828 B2 | 10/2003 | Faymon et al. | |
| 7,065,468 B2 * | 6/2006 | Wiseman | 702/182 |
| 2007/0084211 A1 * | 4/2007 | Bowman et al. | 60/772 |

* cited by examiner

GAS TURBINE ENGINE FAILURE DETECTION

CROSS REFERENCE TO RELATED APPLICATIONS

The present application claims the benefit of U.S. Provisional Patent Application 61/203,925, filed Dec. 30, 2008, and is incorporated herein by reference.

FIELD OF INVENTION

The present invention generally relates to fault detection systems, and more particularly, but not exclusively, to gas turbine engine fault detection systems.

BACKGROUND

Detecting failures and faults in gas turbine engines that lead to uncommanded thrust increases remains an area of interest. Some existing systems have various shortcomings relative to certain applications. Accordingly, there remains a need for further contributions in this area of technology.

SUMMARY

One embodiment of the present invention is a unique fault detection system. Other embodiments include apparatuses, systems, devices, hardware, methods, and combinations for systems that detect uncommanded thrust increases. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
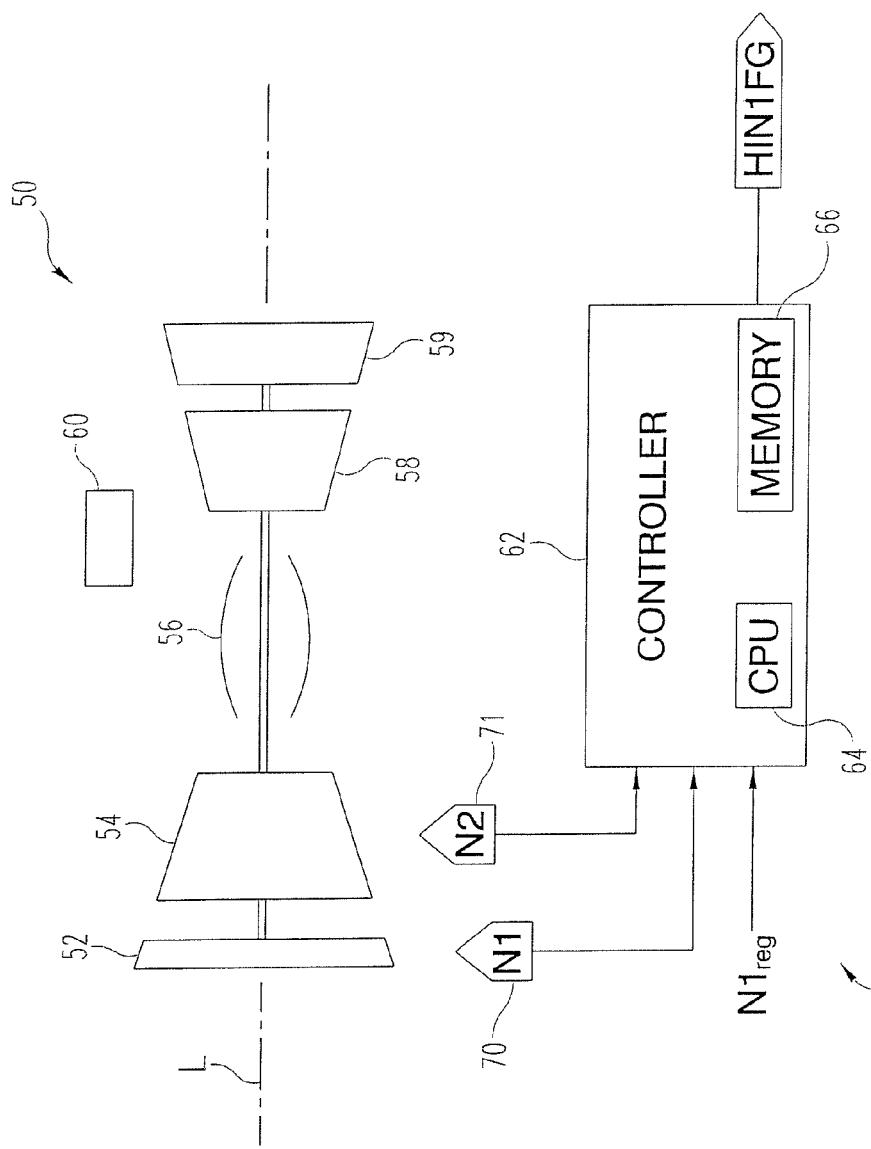
FIG. 1 is a partial, diagrammatic view of a gas turbine engine and fault detection system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a gas turbine engine 50 that can be used to provide flight propulsive power to an aircraft (not shown). As used herein, the term "aircraft" includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, industrial applications, power generation, pumping sets, naval propulsion and other applications known to one of ordinary skill in the art.

The gas turbine engine 50 includes a fan 52, a compressor section 54, a combustor section 56, a high pressure turbine section 58, and a low pressure turbine section 59. The gas turbine engine 50 is depicted as a turbo-fan engine, but other types of gas turbine engines may also be used including, but not limited to, turbojets, turboshafts, and turboprops. In addition, the gas turbine engine 50 can be an axial flow engine, centrifugal flow engine, or a combination thereof.

A fuel main metering valve 60 is integrated with the gas turbine engine 50. In one form the fuel main metering valve 60 includes a feedback position that is used in an engine controller to provide blowout avoidance and minimum fuel flow limiting during engine starting and transient decelerations. The fuel main metering valve may have alternative or additional functions in other embodiments.

A control subsystem 68 is also integrated with the gas turbine engine 50 and is used to detect a fault that causes uncommanded increases in engine rotational speed and/or engine thrust. In one form the control subsystem 68 is used to detect uncommanded increases in a speed N1 of the fan 52. Such an uncommanded increase can be the result of a failure in the feedback position of the fuel main metering valve 60. The failure of the feedback position can be caused by a mechanical failure in a sensor or a transmission failure from sensor, to set forth just two non-limiting examples. Other types of failures may also cause uncommanded increases in N1.

The control subsystem 68 includes several input devices and at least one output. The input devices can take the form of rotation sensors 70 and 71 that measure and/or calculate rotational angles, speeds, and/or accelerations of the fan 52 and the compressor 54. In the illustrative embodiment, sensor 70 detects the rotational speed N1 of the fan 52 and sensor 71 detects the rotational speed N2 of the compressor 54. Additional or alternative sensors can be used with respect to other components of the gas turbine engine 50. For example, sensors can be used to measure and/or calculate rotational angles, speeds, and/or accelerations of rotating components such as compressor rotors, shafts, and/or turbine rotors, to set forth just three non-limiting examples. In some applications, the values supplied by the input devices to a controller 62 can be filtered or otherwise processed, either before delivery to the controller 62 or within controller 62. An operator input device can also be coupled to the controller 62 to provide corresponding operator input to adjust/direct one or more aspects of engine operation.

The output provided by the control subsystem 68 can take a variety of forms such as a numerical variable or flag, to set forth just two non-limiting examples. In the illustrative embodiment, the output is denoted as HIN1FG, which will be described further below. Though FIG. 1 depicts only a single output, other embodiments may include more than one. In other forms, a display, audible alarm, warning light(s), or the like can also be coupled to the controller 62 to respond to one or more various output signals from controller 62.

The controller 62 in the illustrated embodiment includes a central processing unit 64 and a memory 66, and can include other features such as limiters, conditioners, filters, format converters, or the like which are not shown to preserve clarity. The controller 62 is comprised of one or more components that may be configured as a single unit, or distributed among two or more units. The central processing unit 64 and/or the memory 66 can be combined in a common integrated circuit, defined by separate circuitry, or comprised of one or more other component types of a solid state, electromagnetic, optical, or different variety as would occur to those skilled in the art. The controller 62 can include analog circuitry, digital circuitry, and/or a hybrid combination of both of these types. In one form, the controller 62 is of the programmable variety that executes algorithms and processes data in accordance with operating logic that is defined by programming instructions (such as software or firmware). Alternatively or additionally, operating logic for controller 62 is at least partially defined by hardwired logic or other hardware. In one particular form, the controller 62 is configured to operate as a Full Authority Digital Engine Control (FADEC); however, in other embodiments it can be organized/configured in a different manner as would occur to those skilled in the art.

Turning now to FIGS. 2-6, a high N1 detection scheme is schematically shown that can be implemented with the controller 62. The schematics of FIGS. 2-6 disclose one embodiment of a system that provides a fault detection signal denoted as HIN1FG determined from accumulated values of a requested N1 error and a target N1 error. Logic is provided to reset the accumulated values of the requested N1 error and target N1 error, as well as to prevent a fault detection flag from being set if the engine is operated in a number of particular modes or operating conditions.

Figure 2:
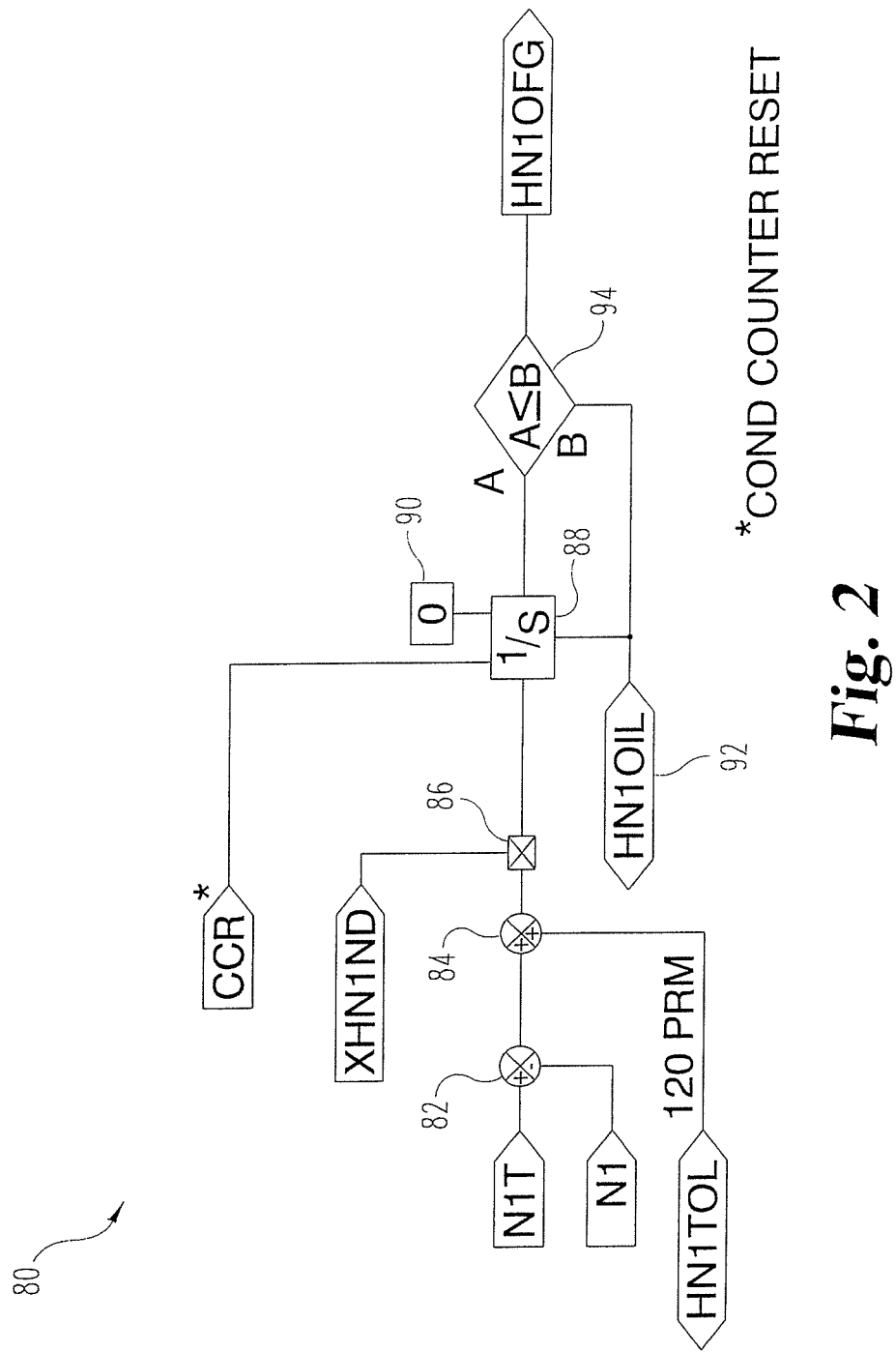
FIG. 2 is a diagrammatic view of a subsystem of the fault detection system of FIG. 1.

Referring more specifically to FIG. 2, target N1 error 80 is schematically depicted which operates to accumulate a value of target N1 error and determine whether the accumulated value exceeds a selected threshold limit. In some embodiments, the selected threshold limit can be a constant or a variable. In some applications, the selected threshold limit can be dependent upon flight condition, to set forth just one non-limiting example. A value of a maximum, or target, N1 value denoted as N1T is compared against a value of N1. N1 is subtracted from N1T at summer 82, and the result is added at summer 84 to a variable HN1TOL which is an offset value to allow some variation between N1 and N1T before a fault indication is generated in control subsystem 68. N1T can be a constant or a variable. To set forth just one non-limiting example, N1T can be a function of pilot throttle position. In some applications, N1T can represent the maximum level of N1 that can be achieved at full throttle position for a given operating condition, bleed request, and/or thrust mode, among potential others. N1 can be a current N1 value, a lagged N1 value, or it can be a filtered N1 value, to set forth just three non-limiting examples. HN1TOL can be a variable or a constant, depending on the application. In the illustrative embodiment, HN1TOL is set at 120 RPM.

The output of summer 84 is multiplied at multiplier 86 by the value XHN1ND which is a value determined from a gain schedule and is described further below. The output from multiplier 86 is then accumulated by integrator 88 to determine a value of target N1 error. In the illustrative form, the integrator 88 includes an upper limit and a lower limit. In other forms, either or both the upper and lower limits may not be present. In the illustrative embodiment, upper limit 90 has a value of zero and lower limit 92 denoted as HN1OIL has a value of −75 RPM-SEC. The upper limit 90 and lower limit 92 can have different values in other embodiments. Furthermore, the upper limit 90 and lower limit 92 can be constant or variable. The integrator 88 is depicted as a continuous element in the illustrative embodiment for descriptive purposes only. In some forms the integrator may be a discrete element. Therefore, no limitation is implied as to the implementation of the present application.

In the illustrative embodiment, integrator 88 includes a built-in limiter that stops the integration if the value of integrator 88 exceeds either the upper or lower limit. In some embodiments, the integrator 88 may not include a built-in limiter. If a limiter is needed in the embodiments lacking built-in limiter functionality, the upper and lower limits 90 and 92 can be applied to the output of integrator 88 and additional block diagram structure can be added to prevent integrator wind-up as would occur to those skilled in the art. In some embodiments, the input to the integrator can be limited.

In the illustrative embodiment, the integrator 88 can be reset to an initial condition using a conditional counter reset, denoted as CCR, which is described further below. The initial condition that the integrator 88 is reset at can be any value, including zero. In some forms the integrator 88 may not include the functionality to be reset. In the forms lacking an internal functionality to be reset, additional block diagram structure can be added to switch out the input to the integrator 88 and feed back the negative value of the output of the integrator 88 divided by the sampling period. Such a block diagram structure can operate on a one-frame basis to reset the integrator back to zero at which point accumulation can begin anew if appropriate.

The output of integrator 88 is compared against the lower limit HN1OIL. If the value of the integrator 88 is less than or equal to HN1OIL, then the output of comparator 94 is equal to one. Otherwise, the output of comparator 94 is zero. The output of comparator 94 is the target N1 error scheme variable HN1OFG.

Figure 3:
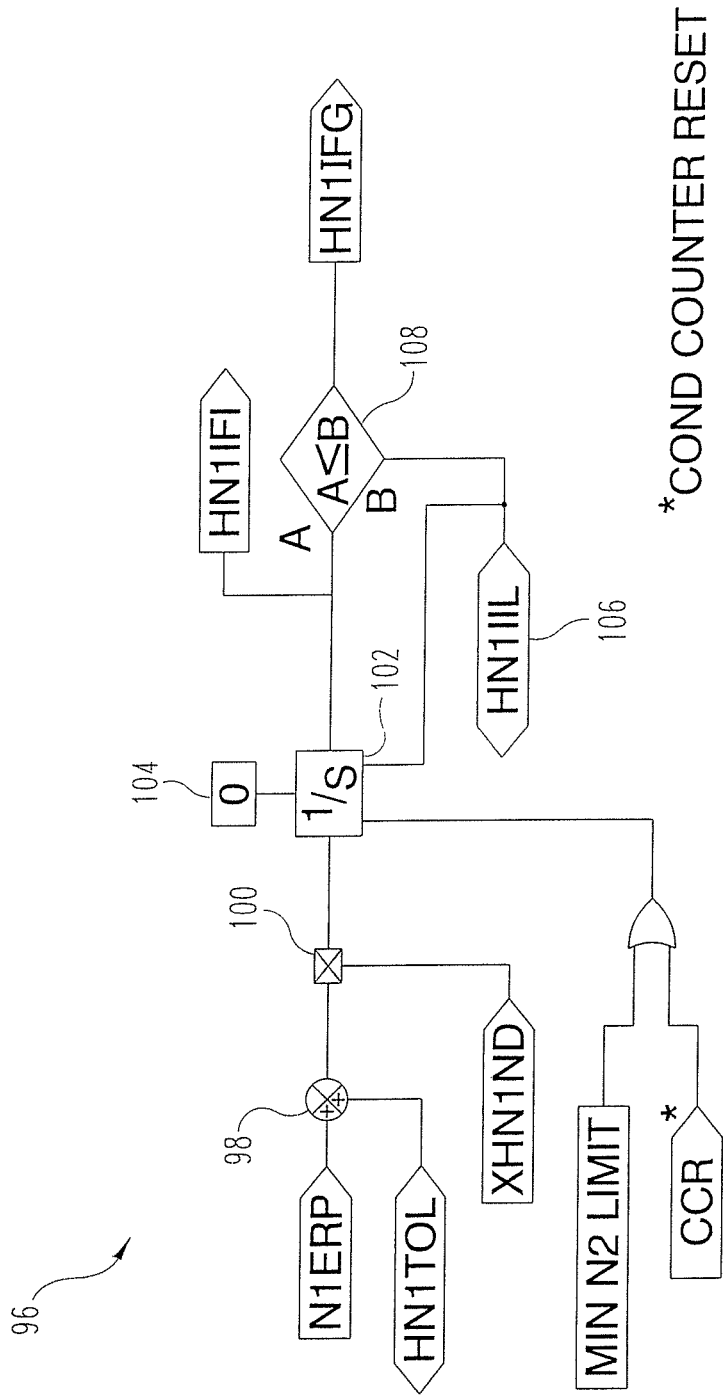
FIG. 3 is a diagrammatic view of a subsystem of the fault detection system of FIG. 1.

Turning now to FIG. 3, requested N1 error scheme 96 is schematically depicted which operates to accumulate a value of requested N1 error and determine whether that accumulated value has exceeded a selected threshold limit. In some embodiments, the selected threshold limit can be a constant or a variable. In one form, the selected threshold limit is dependent upon flight condition. The N1 error signal, N1ERR, represents the error between an N1 request and N1 and is determined elsewhere in control subsystem 68. An N1 request can be in the form of a pilot throttle position or an autopilot command, to set forth just two non-limiting examples. N1ERR is added at summer 98 to HN1TOL which is an offset value to allow some variation between N1 and N1 request before a fault indication is generated in control subsystem 68. In the illustrated embodiment, HN1TOL is set at 120 RPM and is the same variable used in the N1 error scheme of FIG. 2. In other embodiments, the value HN1TOL used in FIG. 2 and/or FIG. 3 can be replaced with another value or values such that the offsets used in FIGS. 2 and 3 are different. N1 can be a current N1 value, a lagged N1 value, or it can be a filtered N1 value, to set forth just three non-limiting examples. The particular value of N1 used in FIG. 3 can be different than the value used in FIG. 2. For example, N1 in FIG. 3 can be current N1 value, while N1 used in FIG. 2 can be a lagged value, to set forth just one non-limiting example. HN1TOL can be a variable or a constant, depending on the application.

The output of summer 98 is multiplied by the value XHN1ND, which is a value determined from a gain schedule described further below. The output of multiplier 100 is then accumulated by integrator 102 to determine a value of N1 error. In the illustrative form, the integrator 102 includes an upper and lower limit. In other forms, either or both the upper and lower limits may not be present. In the illustrative embodiment, upper limit 104 is zero and the lower limit 106, denoted as HN1IIL, has a value of −100 RPM-SEC. The upper limit 104 and the lower limit 106 can have different values in other embodiments. Furthermore, the upper limit 104 and lower limit 106 can be a constant or variable. The integrator 102 is depicted as a continuous element in the illustrative embodiment for descriptive purposes only. In some forms the integrator may be a discrete element. Therefore, no limitation is implied as to the implementation of the present application.

In the illustrative embodiment, integrator 102 includes a built-in limiter that stops the integration if the value of integrator 102 exceeds either the upper or lower limit. In some embodiments, the integrator 102 may not include a built-in limiter. If a limiter is needed in the embodiments lacking built-in limiter functionality, the upper and lower limits 104 and 106 can be applied to the output of integrator 102 and additional block diagram structure can be added to prevent integrator wind-up as would occur to those skilled in the art. In some embodiments, the input to the integrator can be limited.

The integrator 102 includes the ability to be reset to an initial condition. In the illustrative form, the integrator 102 can be reset as a function of minimum N2 limit control indication and the value CCR. The initial condition that the integrator 102 is reset at can be any value, including zero. In some forms the integrator 102 may not include the functionality to be reset. In the forms lacking an internal functionality to be reset, additional block diagram structure can be added to switch out the input to the integrator 102 and feed back the negative value of the output of the integrator 102 divided by the sampling period, to set forth just one non-limiting example. Such a block diagram structure can operate on a one-frame basis to reset the integrator 102 back to zero at which point accumulation can begin anew if appropriate. The value of MIN N2 LIMIT indicates engine operation on the minimum limit of N2, which may be a function of flight condition, among other things.

The output of integrator 102 is compared against HN1IIL. If the output of integrator 102 is less than or equal to HN1IIL, then the output of comparator 108 is equal to one. Otherwise the output of comparator 108 is zero. HN1IFI is set equal to the output of the integrator 102 and is used further hereinbelow. It will be appreciated that the variable HN1IFI can also be used as instrumentation. Furthermore, any variety of instrumentation signals can be placed in numerous locations of controller 62. The output of comparator 108 is the requested N1 error scheme variable HN1IFG.

Figure 4:
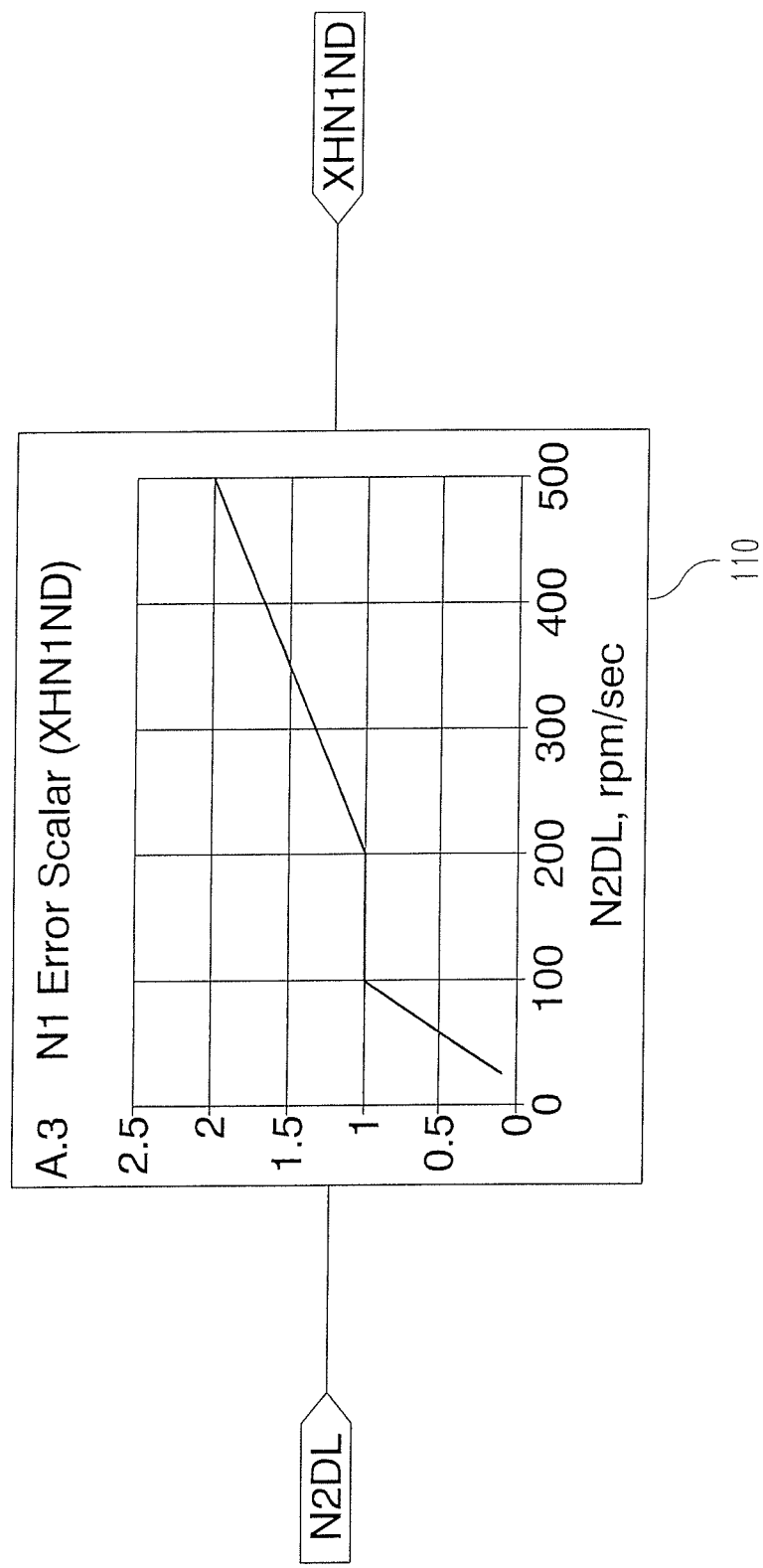
FIG. 4 is a diagrammatic view of a subsystem of the fault detection system of FIG. 1.

FIG. 4 depicts the calculation of the value XHN1ND, which is used in FIGS. 2 and 3, to multiply the error signals in the requested N1 error and target N1 error. A filtered value of N2 rate, N2DL, is provided as input to a gain schedule 110. N2DL is computed or otherwise determined elsewhere. In some forms a raw value of N2 rate can be used as input to the gain schedule 110. The gain schedule 110 relates the gain output value to N2DL and is a piece-wise linear curve. Other shapes of gain schedule 110 can be used, including curvilinear shapes. The gain schedule 110 is depicted as two-dimensional, but if more than one input is provided to FIG. 4 then multi-dimensional tables can also be used. In still other embodiments, the gain schedule may be replaced with a polynomial. In sum, any variety of functions or mathematical tables, to set forth just two non-limiting examples, can be used in place of the depicted gain schedule 110.

Figure 5:
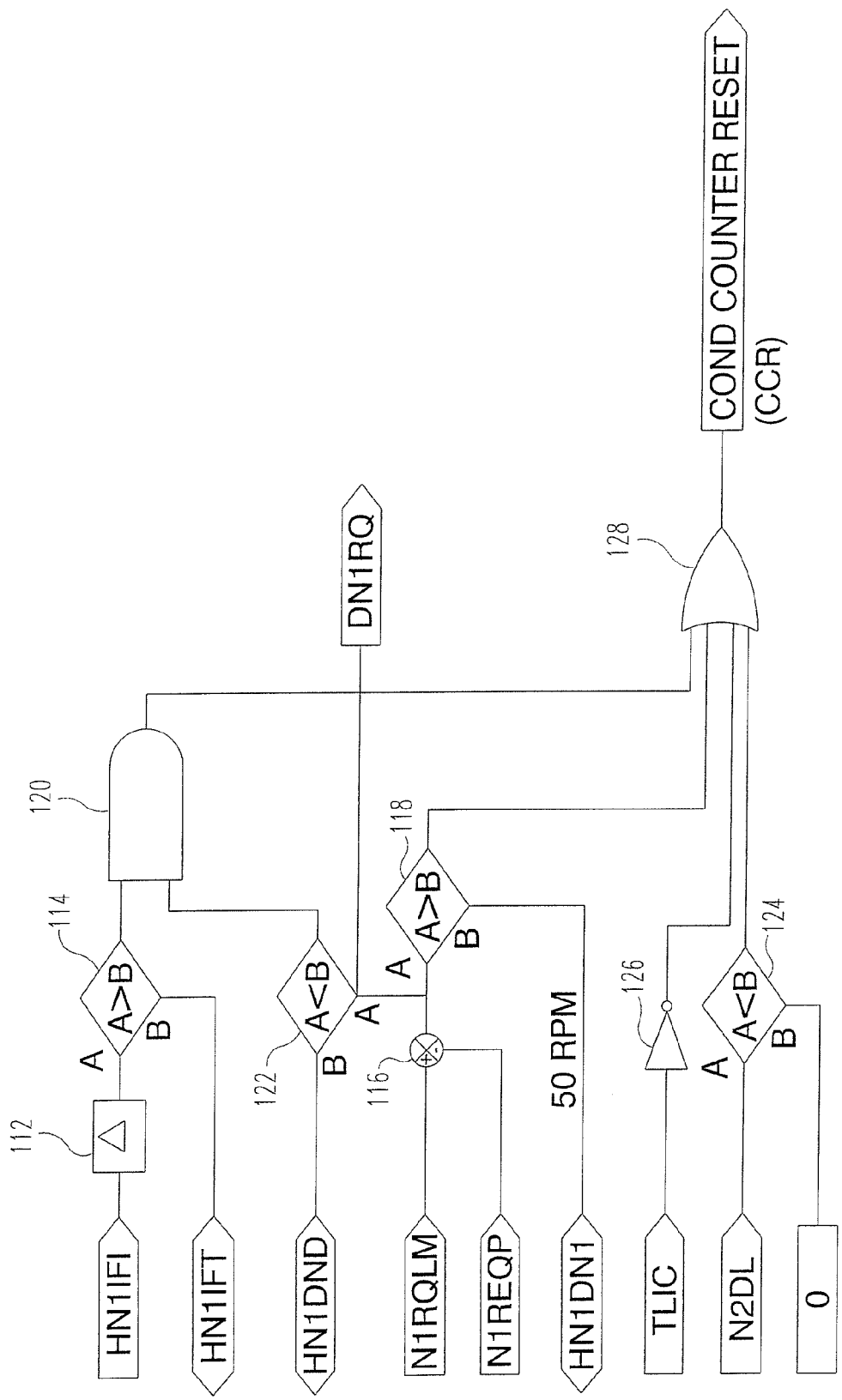
FIG. 5 is a diagrammatic view of a subsystem of the fault detection system of FIG. 1.

The conditional counter reset variable CCR is determined with the structure depicted in FIG. 5 and is used to reset integrators 88 and 102. It will be appreciated that integrators 88 and 102 can be repeatedly reset during engine operation. In some embodiments, however, the control subsystem 68 may not allow the integrators 88 and 102 to be repeatedly reset.

The value HN1IFI described above in the N1 error scheme of FIG. 3 is delayed by one frame through block 112 and compared against a value HN1IFT. Instead of being delayed by one-frame, in some forms block 112 can produce delays greater than one frame. In other forms, block 112 can be a pade approximation of a time delay. No limitation is intended herein regarding the amount or type of delay or the implementation of the delay, whether continuous or discrete. The value HN1IFT represents a threshold value and can be a constant or a variable. In the illustrated embodiment, the value of HN1IFT is set at −25 RPM-SEC, but in other embodiments may have a value determined by engine operating condition among other possible conditions. If HN1IFI is greater than HN1IFT, then the output of comparator 114 is one.

The N1 requested change variable N1RQLM is summed with a first-order lagged version of itself, which is denoted as N1REQP. Instead of being a first-order lagged version, in some forms N1REQP can be delayed by one or more than one frame. In other forms, N1REQP can be a pade approximation of a time delay. No limitation is intended herein regarding the amount or type of lag or delay or the implementation thereof, whether continuous or discrete. N1REQP is subtracted from N1RQLM, and the resultant value of summer 116 is compared through comparator 122 against the value HN1DND which represents a threshold value. HN1DND is set at −25 RPM in the illustrated embodiment, but may take on different values in other embodiments. In some embodiments HN1DND can be a variable. If the output of summer 116 is less than the value HN1DND, then the output of comparator 122 is one. And operator 120 is used to compare the output of comparator 114 to comparator 122. If both comparator 114 and comparator 122 are one, then the output of And operator 120 is one. Instrumentation value DN1RQ is the same as the output of summer 116.

The output of summer 116 is also compared through comparator 118 to a threshold value HN1DN1, which in the illustrated embodiment is set as 50 RPM. HN1DN1 can be other values. In some embodiments HN1DN1 can be variable based upon, for example, engine operating condition.

N2DL is compared through comparator 124 against a constant value, which in the illustrated embodiment is set at zero, but may have other values in other applications or flight conditions. If the value of N2DL is less than zero then the output of comparator 124 is one. A variable that denotes whether this lane is in control, denoted as TLIC, is input into inverter 126 such that if TLIC is equal to one, then the output of inverter 126 is zero.

The output of And operator 120, comparator 118, inverter 126, and comparator 124 are evaluated through an Or operator 128. If any of And operator 120, comparator 118, inverter 126, or comparator 124 are equal to one, then the conditional counter reset CCR is equal to one. Other structure can also be added and used as input to the Or operator 128.

Figure 6:
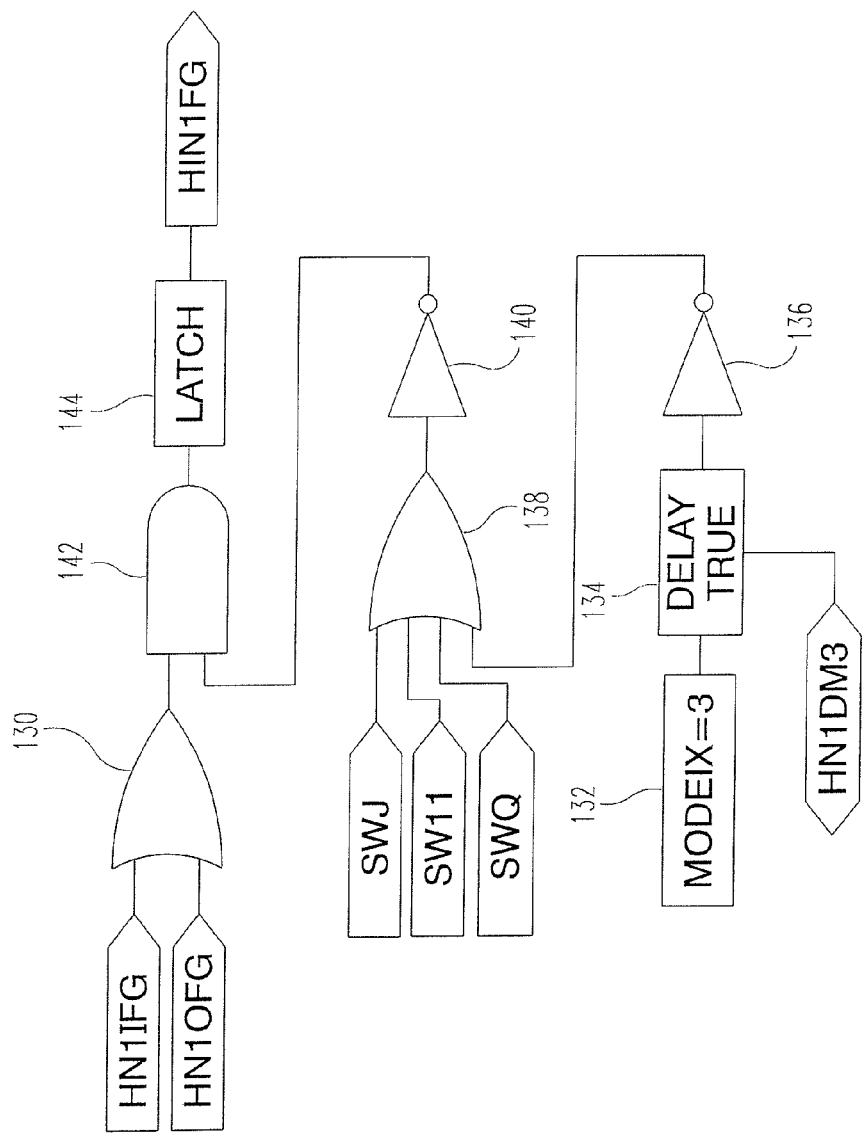
FIG. 6 is a diagrammatic view of a subsystem of the fault detection system of FIG. 1.

Turning now to FIG. 6, block diagram structure is depicted to protect against false or unintended failure detections. The values HN1OFG and HN1IFG, which are the output values of comparators 94 and 108 respectively, are evaluated with Or operator 130. If either HN1OFG or HN1IFG are equal to one, then the output of Or operator 130 is also equal to one. The fault detection system could be solely triggered by Or operator 130 and indicate a fault, but whether the fault detection system determines if a fault has occurred also depends upon a number of other conditions depicted in FIG. 6. Other embodiments may use fewer, or more, conditions than those depicted in FIG. 6. In addition, conditions other than those in FIG. 6 might also be incorporated into the block diagram.

If the control subsystem 68 has determined that the engine has been transitioned to an N1 reversionary mode, then a value SWJ is set to one. In addition, if a manual mode for N1 reversionary mode has been set, then a value SW11 is set to one. Likewise, if the main metering valve is in an open-loop backup mode, then the value SWQ is set to one.

Structure at the bottom of FIG. 6 allows for the fault detection system to protect against false or unintended failure detections. In the illustrative embodiment, if the engine has been operated for less than five seconds after completing the engine start sequence, then the fault detection system will be inoperative. If the value MODEIX is set to three by another portion of the control subsystem 68, or another controller entirely, then that indicates that the gas turbine engine has completed its starting sequence. Values other than the number three could also be used to designate the completion of the engine start sequence. Whenever MODEIX is equal to three then the output of block 132 is one, which is used as an input into a delayed block 134. Delayed block 134 also operates on a variable HN1DM3 which determines how long to delay the output of delayed block 134. In the illustrative embodiment HN1DM3 is set at five seconds; therefore, five seconds after the start sequence is complete (i.e. 5 seconds after MODEIX is equal to three) the output of delayed block 134 will be one. The output of delayed block 134, however, is input to an inverter 136 such that if the engine has been operated for less than five seconds after completing the start sequence then the output of inverter 136 is equal to one, but if the engine has been operated for more than five seconds then the output of inverter 136 is equal to zero.

Or operator 138 is used to evaluate whether the engine is in N1 reversionary mode, whether it has been manually selected to be in N1 reversionary mode, whether the main metering valve is in open loop backup mode, and whether the engine has been operated for more than a selected period. If any of those conditions are true, then the output of the Or operator 138 is one. Other conditions could also be incorporated into the block diagram. The output of the Or operator 138 is input to an inverter 140 such that if any of these modes are true, then the output of inverter 140 is equal to zero. Likewise, if all of the modes are zero and the engine has been operated for greater than five seconds, then the output of inverter 140 is equal to one.

The output of Or operator 130 is compared against the output of inverter 140 with an And operator 142. If both output of Or operator 130 and inverter 140 are equal to one, then And operator 142 equals one and a failure is latched with latch 144. Likewise, if the output of Or operator 130 is equal to one but the output of inverter 140 is equal to zero, which indicates any of the modes are true, then the output of And operator 142 is zero and a failure is not latched. When a failure is latched with latch 144, a high N1 failure flag HIN1FG is set to one in the controller 62. Some embodiments may not include the latch 144. In some forms, the latch 144 can be reset with pilot action or other functions of the controller 62.

One embodiment of the present application includes a fault detection system that detects an uncommanded N1 speed and thrust increase. An accumulator in the form of an integrator is used to accumulate values of an error signal representative of the difference between requested N1 and sensed N1. In addition, a second accumulator, also in the form of an integrator, is used to accumulate values of an error signal representative of the difference between a target N1 and sensed N1, wherein the target N1 is a maximum value of N1. Offset values are added to each error signal before passing through the accumulators to aid in the prevention of error counting during certain portions of engine operation, such as, but not limited to, aircraft maneuvering or changing environmental or external conditions. A fault indicator is set when either of the two accumulators exceeds selected values. The accumulators can be reset to an initial value upon the occurrence of a number of operating conditions or states. For example, the accumulators may be reset when N1 request changes have occurred beyond specified limits, which may occur when a pilot changes throttle position. The fault detection system also can be activated or deactivated based upon the occurrence of a number of operating conditions or states, such as during engine start, whether the engine controller is in reversionary mode, whether reversionary mode has been manually selected, or whether the main metering valve is in open loop backup mode.

One embodiment of the present application provides a method comprising establishing a rotational speed of a gas turbine engine fan; determining a first error signal based upon the difference between the rotational speed and a reference speed; accumulating the error signal to create a first accumulation value; and setting a fault indication when the first accumulation value exceeds a first selected threshold.

One form of the present application provides a method comprising establishing a rotational speed of a gas turbine engine compressor fan; establishing a rotational acceleration of a compressor; determining a fault signal based upon a reference speed, the rotational speed of the gas turbine engine compressor fan, and the rotational acceleration of the compressor; and setting a fault indication when the fault signal exceeds a threshold.

Another form of the present application provides an apparatus comprising a gas turbine engine including a compressor rotor; a sensor operable to generate a sensed value representative of the speed of the compressor rotor; a controller for use with the gas turbine engine having: a reference value representative of a monitored condition; an error value representative of the difference between the sensed value and the reference value; and a fault detector responsive to the error value, the fault detector operable to accumulate the error value and set a fault indicator when an accumulation value exceeds a selected threshold.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
  establishing a rotational speed of a gas turbine engine fan;
  determining a first error signal based upon the difference between the rotational speed and an operational reference speed;

weighting the first error signal based upon a rotational acceleration of an engine core;

accumulating the first error signal to create a first accumulation value;

determining a second error signal based upon the difference between the rotational speed and a commanded reference speed;

accumulating the second error signal to create a second accumulation value; and setting a fault indication when either the second accumulation value or the first accumulation value exceeds a threshold.

2. The method of claim 1, wherein accumulating the first error signal includes integrating the first error signal with an integrator, wherein the rotational speed is N1 and the operational reference speed is a maximum N1.

3. The method of claim 1, wherein accumulating the second error signal includes integrating the second error signal with an integrator, wherein the rotational speed is N1 and the commanded reference speed is an autopilot commanded N1.

4. The method of claim 1, which further includes limiting the first accumulation value within a first selected accumulation value limit.

5. The method of claim 1, which further includes resetting the first accumulation value to an initial condition.

6. The method of claim 5, which further includes satisfying a reset condition prior to resetting the first accumulation value.

7. The method of claim 6, wherein the reset condition is selected from a group that comprises whether a throttle command indicates an increase in power command; whether the controller lane is in control; and whether the engine core is decelerating.

8. The method of claim 1, which further includes prohibiting a fault indication when the gas turbine engine is in a reversionary mode, when a main metering valve is in an open loop backup mode, or when the engine has completed a start sequence for less than a selected time period.

9. A method, comprising:
establishing a rotational speed of a gas turbine engine compressor fan;
establishing a rotational acceleration of a compressor;
forming an error signal based upon the difference between a reference speed and the rotational speed of the gas turbine engine compressor fan and accumulating the error signal to form an accumulated value;
weighting the error signal based upon a rotational acceleration of the compressor;
determining a fault signal based upon the reference speed, the rotational speed of the gas turbine engine compressor fan, and the rotational acceleration of the compressor; and
setting a fault indication when the fault signal exceeds a threshold.

10. The method of claim 9, wherein weighting the error signal is determined by multiplying the error signal by a gain determined from a gain schedule.

11. The method of claim 9, which further includes resetting the fault indication.

12. The method of claim 9, which further includes prohibiting a fault condition.

13. An apparatus, comprising:
a gas turbine engine including a compressor rotor;
a sensor operable to generate a sensed value representative of the speed of the compressor rotor;
a controller for use with the gas turbine engine having:
an operational reference value representative of a first monitored condition;
a first error value representative of the difference between the sensed value and the operational reference value;
a weight based upon a rotational acceleration of an engine core and applied to the first error value;
a commanded reference value representative of a second monitored condition;
a second error value representative of the difference between the sensed value and the commanded reference value; and
a fault detector responsive to the first error value, and operable to accumulate the first error value, and responsive to the second error value and operable to accumulate the second error value, and configured to set a fault indicator when either the first accumulation value or the second accumulation value exceeds a threshold.

14. The apparatus of claim 13, wherein the controller further includes a means for resetting the fault detector.

15. The apparatus of claim 13, wherein the controller further includes a protection configured to prevent a false or unintended failure indicator.

16. The apparatus of claim 13, wherein the operational reference value comprises a maximum reference value, the commanded reference value comprises an autopilot commanded reference value, and the controller is configured to limit the first accumulation value within a first selected accumulation value limit.

17. The apparatus of claim 13, wherein the controller is configured to reset the first accumulation value to an initial condition, and the controller is configured to determine whether a reset condition is satisfied and to reset the first accumulation value if the controller determines that the reset condition is satisfied.

18. The apparatus of claim 17, wherein the reset condition is selected from a group that comprises whether a throttle command indicates an increase in power command; whether the controller lane is in control; and whether the engine core is decelerating.

19. The apparatus of claim 13, wherein the controller is configured to prohibit setting of a fault indicator when the gas turbine engine is in a reversionary mode, when a main metering valve is in an open loop backup mode, or when the engine has completed a start sequence for less than a selected time period.

* * * * *